(12) United States Patent
Fouarge (10) Patent No.: US 8,138,282 B2
(45) Date of Patent: Mar. 20, 2012

(54) LOOP REACTOR SUITABLE FOR OLEFIN POLYMERIZATION WITH IMPROVED PRODUCT REMOVAL MEANS

(75) Inventor: Louis Fouarge, Dilbeek (BE)

(73) Assignee: Total Petrochemicals Research Feluy, Seneffe (Feluy) (BE)

( * ) Notice: Subject to any disclaimer, the term of this patent is extended or adjusted under 35 U.S.C. 154(b) by 0 days.

(21) Appl. No.: 12/675,005

(22) PCT Filed: Aug. 29, 2008

(86) PCT No.: PCT/EP2008/061416
§ 371 (c)(1),
(2), (4) Date: Feb. 7, 2011

(87) PCT Pub. No.: WO2009/027518
PCT Pub. Date: Mar. 5, 2009

(65) Prior Publication Data
US 2011/0124828 A1 May 26, 2011

(30) Foreign Application Priority Data

Aug. 31, 2007 (EP) .................................... 07115369

(51) Int. Cl.
*C08F 2/12* (2006.01)
*B01J 19/18* (2006.01)
*C08F 10/02* (2006.01)

(52) U.S. Cl. ............ 526/64; 526/65; 526/918; 526/920; 422/132

(58) Field of Classification Search ................... 526/64, 526/65, 918, 920; 422/132
See application file for complete search history.

(56) References Cited

U.S. PATENT DOCUMENTS

| 3,172,737 A | * | 3/1965 | Whittington | .................. 422/132 |
| 4,613,484 A | | 9/1986 | Ayres | |
| 2005/0272891 A1 | | 12/2005 | Fouarge | |

FOREIGN PATENT DOCUMENTS

| EP | 1564224 | 8/2005 |
| EP | 1618136 | 4/2007 |

* cited by examiner

*Primary Examiner* — Fred M Teskin (57) ABSTRACT

The present invention relates to a loop reactor suitable for olefin polymerization process comprising:
 a plurality of interconnected pipes defining a flow path for a polymer slurry, said slurry consisting essentially of an olefin reactant, a polymerization catalyst, liquid diluent and solid olefin polymer particles,
 means for introducing olefin reactant, polymerization catalyst and diluent into said reactor,
 a pump suitable for maintaining the polymer slurry in circulation in said reactor, and
 single settling leg connected to said loop reactor through (a) a take off line extending from said reactor to said settling leg and configured to remove said polymer slurry from said reactor, and (b) a return line extending from said settling leg to said reactor,
characterized in that said take off line is radially connected to said single settling leg.

11 Claims, 4 Drawing Sheets

LOOP REACTOR SUITABLE FOR OLEFIN POLYMERIZATION WITH IMPROVED PRODUCT REMOVAL MEANS

CROSS-REFERENCE TO RELATED APPLICATIONS

This application claims the benefit of PCT/EP2008/1061416, filed Aug. 29, 2008, which claims priority from EP 07115369.6, filed Aug. 31, 2007.

FIELD OF THE INVENTION

The present invention relates to improvements in the removal of polymer slurry from a reactor for olefin slurry polymerization. The present invention also relates to improvements in the transfer of polymer slurry from one olefin polymerization loop reactor to another olefin polymerization loop reactor. The present invention also relates to a loop reactor with improved product removal means.

BACKGROUND OF THE INVENTION

Olefin polymerizations such as ethylene polymerization are frequently carried out using monomer, diluent and catalyst and optionally co-monomers in a loop reactor. The polymerization is usually performed under slurry conditions, wherein the product consists usually of solid particles and is in suspension in a diluent. The slurry contents of the reactor are circulated continuously with a pump to maintain efficient suspension of the polymer solid particles in the liquid diluent, the product being often taken off via several settling legs which are mounted directly on the polymerization reactor and are periodically filled and discharged in a sequential manner to recover the product. Settling in the legs is used to increase the solids concentration of the slurry finally recovered as product slurry. The product slurry is further discharged to a flash tank, through flash lines, where most of the diluent and unreacted monomers are flashed off and recycled. Alternatively, the product slurry may be fed to a second loop reactor serially connected to the first loop reactor where a second polymer fraction may be produced. Typically, when two reactors in series are employed in this manner, the resultant polymer product, which comprises a first polymer fraction produced in the first reactor and a second polymer fraction produced in the second reactor, has a bimodal molecular weight distribution. These techniques have enjoyed international success with millions of tons of ethylene polymers being so produced annually.

Optimal behavior of the settling legs is reached when the quantity of recovered polymer is maximized with respect to the amount of fluid effluent that must be recycled, so that the recycling cost may be minimized for a given production rate. Classically, operation of the plant is based on attempting to discharge the same amount of slurry from all settling legs in order to afford equivalent pressure drops when discharging each leg, however this operation may be far from optimal.

Various alternative product removal techniques are however known. For example, WO 01/05842 describes an apparatus for removing concentrated slurry from a flowing stream of slurry in a conduit characterized by a channel in an outlet area of the conduit, the outlet being adapted to continuously remove slurry.

EP 0891990 describes an olefin polymerization process wherein the product slurry is recovered by means of a continuous product take off, more in particular by means of an elongated hollow appendage provided on the reactor. Said hollow appendage being in direct fluid communication with a heated flash line and thus being adapted for continuous removal of product slurry.

U.S. Pat. No. 4,613,484 describes a method and an apparatus for the separation of solid particulate polymer from liquid diluent comprising the use of one or more accumulator legs to which diluent is supplied, and separated diluent is recycled to the polymerization process.

EP 1 564 224 describes a set of loop reactor and a method to switch from series to parallel configuration for these loop reactors, using a three-or more-way valve positioned after the control valve of one or more settling legs.

However the above-described known apparatuses and processes have the disadvantage that the suspension withdrawn from the reactor still contains a large amount of diluent and other reactants, such as monomer, which implies the necessity of subsequently separate it from the polymer particles and to reprocess it for the purpose of reusing it in the reactor.

U.S. Pat. No. 6,586,537 describes a process wherein the product slurry is recovered by means of a hydrocyclone separator, which concentrates the slurry using centrifugal forces. This hydrocyclone is operated with a liquid stream nearly depleted in solids thereby necessitating a tight control of the operation conditions.

It is therefore an object of the present invention to provide a loop reactor having improved operating conditions. It is further an object of the invention to provide an improved polymerization process occurring in a loop reactor wherein the polymer slurry is efficiently removed from said reactor. Another object of the invention is to provide an improved process wherein the settling efficiencies of the polymer slurry and its further discharge are optimized. Another object of the present invention is to increase the reactor throughput by providing stable operation conditions. Another object of the present invention is to increase the weight percent (wt %) of polymer solids in the polymerization slurry circulating in the polymerization zone in the loop reactor.

SUMMARY OF THE INVENTION

In a first aspect, the present invention relates to a loop reactor suitable for olefin polymerization process comprising: a plurality of interconnected pipes defining a flow path for a polymer slurry, said slurry consisting essentially of an olefin reactant, a polymerization catalyst, liquid diluent and solid olefin polymer particles means for introducing olefin reactant, polymerization catalyst and diluent into said reactor, a pump suitable for maintaining the polymer slurry in circulation in said reactor, and a single settling leg indirectly connected to said reactor.

As used herein the term "indirectly connected" means that an intermediate connecting line or pipe, herein referred as "take off line", is provided between the reactor pipe and the settling leg for their mutual connection, wherein said take off line is configured to remove the polymer slurry from the reactor.

More in particular, the present invention relates to a loop reactor suitable for olefin polymerization process comprising: a plurality of interconnected pipes defining a flow path for a polymer slurry, said slurry consisting essentially of an olefin reactant, a polymerization catalyst, liquid diluent and solid olefin polymer particles, means for introducing olefin reactant, polymerization catalyst and diluent into said reactor, a pump suitable for maintaining the polymer slurry in circulation in said reactor, and a single settling leg connected to said loop reactor through (a) a take off line extending from said reactor to said settling leg and configured to remove polymer slurry from said loop reactor, and (b) a return line extending from said settling leg to said reactor, characterized in that said take off line is radially connected to said single settling leg.

In an embodiment, said return line is configured to remove diluent and/or unsettled polymer from the top of the settling leg and to return said removed diluent and/or unsettled polymer to the reactor.

As used herein term "radially" may be used to describe positions or movement perpendicular to the longitudinal axis of the settling leg.

The use of a radially connected take off line, allows radial injection of the polymer slurry. A better deposition (settling) of the polymer is thereby obtained since radial introduction of the polymer slurry diminishes or avoids perturbations of the settled polymer.

In an embodiment, said single settling leg is connected to said reactor through the intermediate of at least one (take off line) connecting line, whereby said at least one connecting line has an internal diameter equal to 0.14 to 0.3 times the internal diameter of the loop reactor pipe. In an embodiment, said take off line is connected in the upper third of said single settling leg. In another embodiment of the present invention, said take off line is connected to the reactor downstream of the pump, and said return line is connected to said reactor upstream of said pump.

Said single settling leg can be of any suitable size to efficiently allow the settling of a polymer slurry. For example, said single settling leg may have an internal diameter ranging from 0.5 times to 5.0 times the internal diameter of the reactor's pipes. In a preferred embodiment, the internal diameter of said single settling leg can be at least equal to 0.7 times to 2.0 times, preferably 0.8 to 2 times, preferably 0.8 to 1.7 times and most preferably 1.0 to 1.5 times the internal diameter of the reactor pipes. In an embodiment, said settling leg has a surface between $0.002 \text{ m}^2$ to $0.200 \text{ m}^2$ per ton/hour of production with a preferred surface of 0.005 to $0.050 \text{ m}^2$ per ton/hour and a most preferred surface of 0.010 to $0.020 \text{ m}^2$ per ton/hour of production.

It was found that the use of a loop reactor according to the invention, comprising a single settling leg as defined above, does not increase the frequency of plugging of the discharge valve of said settling leg, but provides optimal product discharge into a product recovery zone in a cost-effective way.

Since the reactors have gotten larger, logistic problems are presented by the use of a plurality of settling legs. As the volume of the reactor goes up more withdrawal capacity is needed. Hence the number of legs required begins to exceed the physical space available. The present invention with the use of a single settling leg indirectly connected to the reactor overcomes the above mentioned problem and allows for an optimized settling and further discharge of the polymer slurry settled in said settling leg in a cost effective way. The presence of the intermediate connecting line allows the use of a settling leg of larger diameter compared to the reactor pipe. The use of a single large settling leg also provides several advantages, such as the possibility of using smaller connecting pipes for connecting the settling leg to the reactor. Using pipes of reduced diameter improves the security on the site. Indeed, using small connecting pipes provide a reduced flow of polymer compared to the prior art and allows therefore a better control of the situation in case of problems such as leakage or plugging.

The use of a single settling leg instead of a hydrocyclone also allows to have a much lower pressure drop across the concentrating equipment and also much more flexibility regarding the flow rate through the equipment. The present settling leg does not rely at all on the centrifugal forces to increase the slurry concentration, but only on gravitational forces. The use of gravitational forces provides the advantage that the pressure drop across the equipment is lower. Moreover, the construction of the reactor of the present invention is also easier and straightforward.

Moreover, contrarily to a hydrocyclone which is operated with the liquid stream nearly completely depleted in solids, the present invention provides more flexibility in the flow rate of slurry going trough the settling leg and thereby does not necessitate a control of the liquid stream. The settling leg of the present invention is also cheaper to build and is more robust. The settling leg of the present invention may also by used as a bypass of the reactor according to the operating conditions needed.

In a second aspect, the present invention relates to multiple loop reactors suitable for olefin polymerization comprising at least two loop reactors, whereby a first and second loop reactors are connected in series via a single settling leg of the first reactor, characterized in that said settling leg is indirectly connected to said first reactor.

More in particular, the present invention provides multiple loop reactors suitable for olefin polymerization comprising at least two loop reactors, whereby a first and second loop reactors are connected in series via a single settling leg of the first reactor, characterized in that said settling leg is connected to said first loop reactor through (a) a take off line extending from said first reactor to said settling leg and configured to remove said polymer slurry from said first reactor, and (b) a return line extending from said settling leg to said first reactor, wherein said take off line is radially connected to said single settling leg.

The present invention provides several advantages over the prior art including: significantly increasing the maximum monomer concentration in the loop reactor liquid medium thereby increasing reactor throughput; minimizing the number of equipment such as a single leg instead of multiple legs, significantly increasing the weight percent of polymer solids in the polymerization slurry. Two or more loop reactor according to the invention used in series allowed for an optimized conveying of the settled slurry from said single settling leg to the next loop reactor. With the use of a single settling leg as presently configured, less diluent and more polymer is transferred from the first reactor to the second reactor.

In a third aspect, the present invention relates to a polymerization process for producing olefin polymers in a loop reactor, comprising the steps of introducing into the loop reactor one or more olefin reactants, polymerization catalysts and diluents, and while circulating said reactants, catalysts and diluents, polymerizing said one or more olefin reactants to produce a polymer slurry comprising essentially liquid diluent and solid olefin polymer particles, said process further comprising one or more cycles of: (a) withdrawing a portion of the slurry from a section of said reactor, (b) introducing the polymer slurry into a single settling leg, (c) allowing said polymer slurry to settle into said single settling leg, and (d) withdrawing unsettled polymer slurry from an upper zone of said settling leg and recycling the withdrawn unsettled polymer slurry to the loop reactor; and/or while (e) discharging the settled polymer slurry from a lower zone of said single settling leg out of the reactor into a product recovery zone or into another reactor. The process according to the present invention further comprises the step of radially introducing the polymer slurry into said single settling leg.

More in particular, the present invention provides a polymerization process for producing olefin polymers in a loop reactor, comprising the steps of introducing into the loop reactor one or more olefin reactants, polymerization catalysts and diluents, and while circulating said reactants, catalysts and diluents, polymerizing said one or more olefin reactants to produce a polymer slurry comprising essentially liquid diluent and solid olefin polymer particles, said process further comprising one or more cycles of: (a) withdrawing a portion of the slurry from a section of said reactor, (b) radially introducing the polymer slurry into a single settling leg through a take off line extending from said reactor to said settling leg, (c) allowing said polymer slurry to settle into said single settling leg, and (d) withdrawing unsettled polymer slurry from an upper zone of said settling leg and recycling the withdrawn unsettled polymer slurry to the loop reactor; through a return line extending from said settling leg to said reactor, and/or while (e) discharging the settled polymer slurry from a lower zone of said single settling leg out of the reactor into a product recovery zone or into another reactor.

Surprisingly, it has been found that the use of the loop reactors and polymerization processes according to the present invention allows operation of said reactors at much higher solids concentration. Hence concentrations of greater than 40 weight percent are possible in accordance with this invention. When used in series the reactors according to the invention allowed for an optimized transfer of the settled slurry from said single settling leg to the next loop reactor, in a cost-effective way.

The present invention will be further disclosed in detail hereunder. The description is only given by way of example and does not limit the invention. The reference numbers relate to the hereto-annexed figures.

DETAILED DESCRIPTION OF THE INVENTION

This invention relates to loop reactors suitable for olefin polymerization process utilizing a diluent, so as to produce a product slurry of polymer and diluent. The loop reactor according to the invention are particularly suitable for polymerization processes, wherein a polymerization effluent is formed which is a slurry of particulate polymer solids suspended in a liquid medium, ordinarily the reaction diluent and unreacted monomers.

The present invention is applicable to any process producing an effluent comprising a slurry of particulate polymer solids suspended in a liquid medium comprising a diluent and unreacted monomer. Such reaction processes include those which have come to be known in the art as particle form polymerizations.

The present invention is particularly suitable for polymerization process for the manufacture of particulate olefin polymers consisting of the catalytic polymerization of olefins such as $C_2$ to $C_8$ olefins in a diluent containing the monomer to be polymerized, the polymerization slurry being circulated in a loop reactor to which the starting material is fed and from which the polymer formed is removed. Examples of suitable monomers include but are not limited to those having 2 to 8 carbon atoms per molecule, such as ethylene, propylene, butylene, pentene, butadiene, isoprene, 1-hexene and the like.

The polymerization reaction can be carried out at a temperature of from 50 to 120° C., preferably at temperature of from 70 to 115° C., more preferably at temperature of from 80 to 110° C., and at a pressure of from 20 to 100 bar, preferably at pressure of from 30 to 50 bar, more preferably at pressure of 37 to 45 bar.

In a preferred embodiment, present invention is particularly suitable for the polymerization of ethylene in isobutane diluent. Suitable ethylene polymerization includes but is not limited to homopolymerization of ethylene, copolymerization of ethylene and a higher 1-olefin co-monomer such as 1-butene, 1-pentene, 1-hexene, 1-octene or 1-decene. In an embodiment of the present invention, said co-monomer is 1-hexene. In another embodiment the present invention is described in terms of the polymerization of ethylene for manufacturing bimodal polyethylene (PE). "Bimodal PE" refers to PE that is manufactured using two reactors, which are connected to each other in series.

Ethylene polymerizes in a liquid diluent in the presence of a catalyst, optionally a co-catalyst, optionally co-monomer, optionally hydrogen and optionally other additives, thereby producing a polymerization slurry.

As used herein, the term "polymerization slurry" or "polymer slurry" or "slurry" means substantially a multi-phase composition including at least polymer solid particles and a liquid phase and allow for a third phase (gas) to be at least locally present in the process, the liquid phase being the continuous phase. The solids include catalyst and polymerized olefin, such as polyethylene. The liquids include an inert diluent, such as isobutane, with dissolved monomer such as ethylene and optionally, one or more co-monomers, molecular weight control agents, such as hydrogen, antistatic agents, antifouling agents, scavengers, and other process additives.

Suitable diluents are well known in the art and include hydrocarbons which are inert or at least essentially inert and liquid under reaction conditions. Suitable hydrocarbons include isobutane, n-butane, propane, n-pentane, isopentane, neopentane, isohexane and n-hexane, with isobutane being preferred.

Suitable catalysts are well known in the art. Examples of suitable catalysts include but are not limited to chromium oxide such as those supported on silica, organometal catalysts including those known in the art as "Ziegler" or "Ziegler-Natta" catalysts, metallocene catalysts and the like. The term "co-catalyst" as used herein refers to materials that can be used in conjunction with a catalyst in order to improve the activity of the catalyst during the polymerization reaction.

Figure 1:
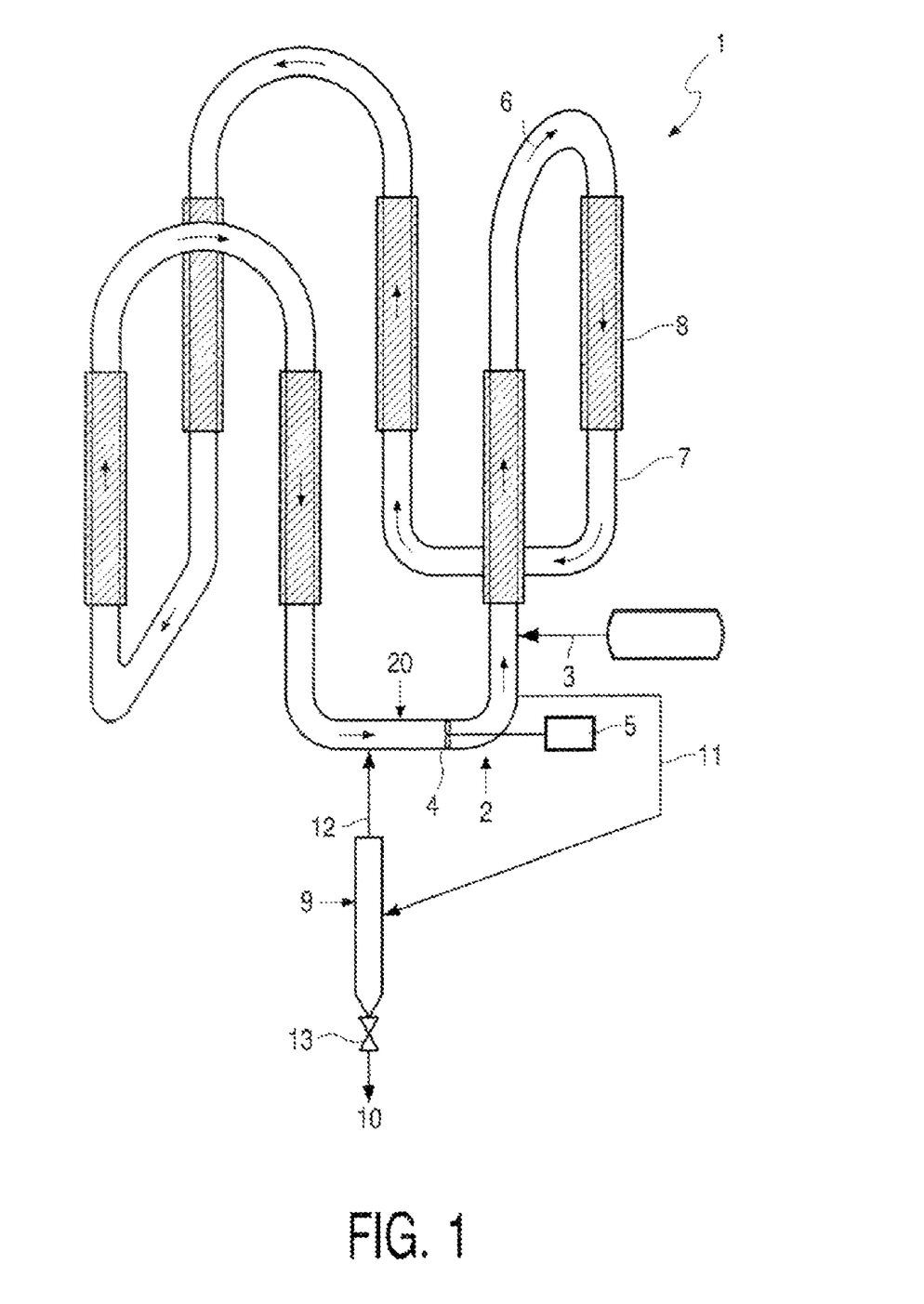
FIG. 1 represents a schematic perspective view of a loop reactor according to an embodiment of the present invention.

FIG. 1 represents a single loop reactor 1 according to an embodiment of the invention, consisting of a plurality of interconnected pipes 7. It will be understood that while the loop reactor A is illustrated with six vertical pipes, said loop reactor A may be equipped with less or more pipes, such as 4 or more pipes, for example between 4 and 20 vertical pipes. The vertical sections of the pipe segments 7 are preferably provided with heat jackets 8. Polymerization heat can be extracted by means of cooling water circulating in these jackets 8 of the reactor.

Reactants such as diluent, monomer, optional co-monomers and reaction additives can be introduced into the reactor 1 by line 3. Catalyst, optionally in conjunction with a co-catalyst or activation agent, can be injected in the reactor 1 via the conduct 20. In a preferred embodiment, catalysts are introduced just upstream from the circulation pump, and diluent, monomer, optional co-monomers and reaction additives are introduced just downstream of the circulation pump.

The polymerization slurry is directionally circulated throughout the loop reactor 1 as illustrated by the arrows 6 by one or more pumps, such as axial flow pump 2. The pump may be powered by an electric motor 5. As used herein the term "pump" includes any device from compressing driving, raising the pressure of a fluid, by means for example of a piston or set of rotating impellers 4.

The reactor 1 is further provided with a single settling leg 9 indirectly connected to the loop reactor 1. Said settling leg 9 is connected to said loop reactor 1 through a take off line 11 extending from said reactor 1 to said settling leg 9 and a return line 12 extending from said settling leg 9 to said reactor 1. In an embodiment of the present invention, the take off line 11 is connected to the reactor downstream of the pump 2, and said return line 12 is connected to the pipe 7 of said reactor upstream of said pump 2.

Said take off line 11, is configured to convey the polymer slurry from the reactor into the settling leg. Said take off line 11, can be straight or curved or may be formed of straight and curved sections, for example wherein straight sections are connected to each other by one or more elbow. In an embodiment said take off line 11 consists of three straight pipes connected to each other through two elbows, one end of the line being connected to the reactor's pipe 7 and the second to the settling leg 9. Preferably, the internal diameter of said take off line 11 is equal to about 0.14 to about 0.3 times the internal diameter of the loop reactor pipe, more preferably from 0.15 to 0.25 times the internal diameter of the reactor pipe, more preferably from 0.16 to 0.25 times the internal diameter of the reactor pipe, yet more preferably from 0.20 to 0.25 times the internal diameter of the reactor pipe. For example for a reactor with pipes of internal diameter of about 500 to 700 mm, the internal diameter of said take off line 11 can be from 101.6 mm to 122.4 mm. In particular for a reactor with pipes of a internal diameter of 24 inches, the internal diameter of said take off line 11 can be of 4 to 6 inches, preferably 6 inches.

Said return line 12, can be straight or curved or may be formed of straight and curved sections, for example wherein straight sections are connected to each other by one or more elbow. In an embodiment said return line is straight. In an embodiment, said return line 12 is configured to withdraw unsettled polymer slurry from the upper zone of said settling leg 9 and to recycle it to said reactor. As used herein "unsettled polymer slurry" refers to a polymer slurry comprising diluent with about 5 to 55% of polymer particles, for example 10 to 55%, for example 20 to 55%, for example 30 to 55%. Preferably, the internal diameter of said return line 12 is equal to about 0.14 to about 0.3 times the internal diameter of the loop reactor pipe, more preferably from 0.15 to 0.25 times the internal diameter of the reactor pipe, more preferably from 0.16 to 0.25 times the internal diameter of the reactor pipe, yet more preferably from 0.20 to 0.25 times the internal diameter of the reactor pipe.

The settling leg 9 can be provided with product take off or discharge valves 13. The discharge valve 13 may be any type of valve, which can permit continuous or periodical discharge of polymer slurry, when it is fully open. An angle valve, or ball valves may be suitably used. For example, the valve may have such a structure that solid matter is prevented from accumulating or precipitating at the main body portion of the valve. However, the type and structure of the discharge valve can be selected by those skilled in the art as required. A part or the totality of the leg is discharged at each opening of the discharge valve. Polymer slurry settled in the settling leg 9 may be removed by means of one or more product recovery lines 10, e.g. to a product recovery zone.

Although not illustrated herein, the diluent can be introduced directly into the settling leg 9 by means of an additional diluent feeding line. In an embodiment, said additional diluent feeding line can be provided in the bottom part of the settling leg 9. The use of the additional diluent feeding line permits to reduce the amount of monomers and co-monomers withdrawn from the reactor.

The polymer slurry is drawn off from said reactor 1 into said single settling leg 9 from the take off line 11 which can be connected to the pipe 7 just downstream of the pump 2 and the non-settled slurry is recycled to the polymerization reactor through the return line 12 which can be connected to the pipe 7 just upstream of the pump 2 so as to give the greatest possible pressure differential. For example, said settling leg 9 can be connected to the bottom elbow of the reactor through said take off line 11 and return line 12. Said settling leg may be connected at different positions on said reactor as long as it exist a difference in pressure. The pressure is highest after the pump and then decreases to reach a minimum just before the pump. In another embodiment, a pump may be installed on the return line 12, which can then be connected anywhere to the reactor.

Furthermore, if suitable, a portion or all of the settling leg may be further insulated and provided with a cooling jacket or the like.

Figure 2:
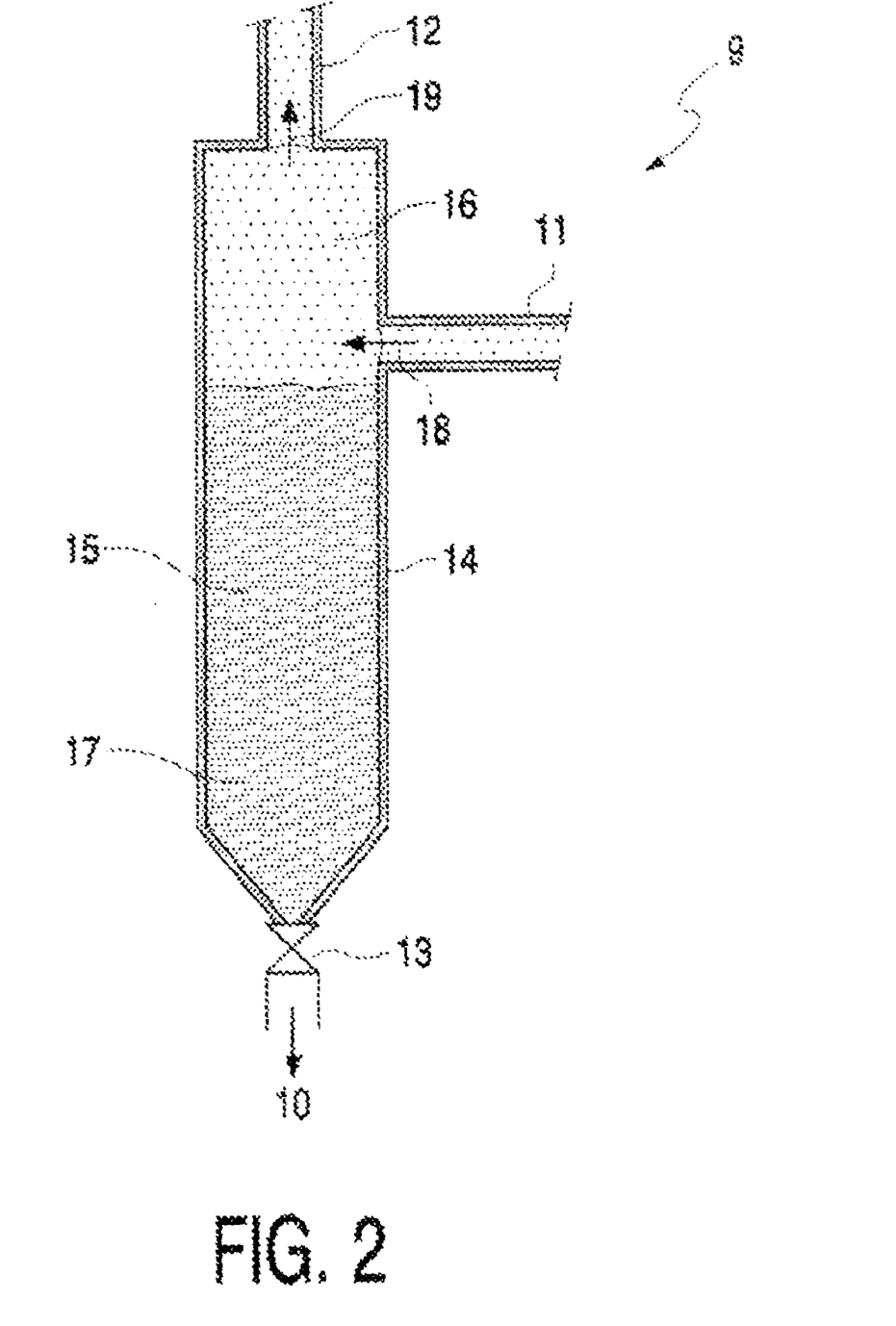
FIG. 2 represents a schematic cross sectional view of the settling leg and valve of the loop reactor of FIG. 1, showing settling of the polymer slurry therein.

FIG. 2 shows a schematic cross sectional view of the settling leg 9 of FIG. 1 with take off line 11, a return line 12 and a valve 13. The settling leg 9 includes a tubular wall 14 defining an upwardly extending chamber 15 above the valve 13.

The size of the settling leg is preferably determined by the polymerization conditions such as particle size of the polymer, production rate, solid concentration . . . . For example, for a production of 20 ton/hour of polymer, the diameter of the settling leg may be around 0.61 m. In an embodiment the surface of the settling leg required can be equal to 0.015 m$^2$ per ton/hour of production. For example, a 30 ton/hour production requires more or less a surface of 0.45 m$^2$ leading to a diameter of 0.76 m.

Examples of suitable ranges for the surface of said settling leg can be 0.002 m$^2$ to 0.200 m$^2$ per ton/hour of production with a preferred surface of 0.005 to 0.050 m$^2$ per ton/hour and a most preferred surface of 0.010 to 0.020 m$^2$ per ton/hour of production. In a preferred embodiment, the internal diameter of said single settling leg is equal to 0.8 to 2 times the internal diameter of the loop reactor pipe.

The internal diameter of the chamber 15 may be ranging from 0.30 to 30.05 m. For example, said internal diameter may be ranging from 0.46 to 0.81 m for a production rate of 20 ton/hour of polymer. In another example, for a production of 40 ton/hour of polymer said internal diameter may be ranging from 0.51 to 1.27 m.

The polymer slurry 16 is withdrawn from the reactor 1 through the take off line 11 and can be radially introduced into the settling leg 9 via entry port 18. The entry port 18 which is radial can be in the upper portion of the settling leg 9, i.e. above or at the mid point, but below the actual top portion of the settling leg 9. In an embodiment, said entry port 18 is located in the upper third of the settling leg 9. The entry port 18 may be formed in any suitable shape, such as circular, rectangular, oval, or a combination thereof. Preferably, said entry port 18 has a circular shape.

Figure 5:
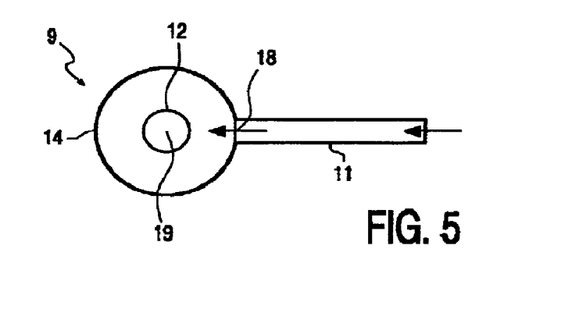
FIG. 5 represents a schematic top view of the settling leg of FIG. 2.

Contrarily to a hydrocyclone, the entry port into the settling leg is radial and there are no centrifugal forces at action as shown on FIG. 5. The polymer slurry settles in the bottommost part of the chamber 15 and progressively the volume of the settled polymer slurry 17 grows upwardly. Although the lowest part of the chamber 15 is illustrated herein as being tapered, said lowest part may be of any suitable shape to allow the efficient removal of the polymer slurry. In an embodiment of the present invention, said lowest part is conically shaped. The angle of the cone can be higher than 45°, preferably higher than 60° and most preferably at an angle of 70° to the horizontal. The diameter of the outlet can be of any suitable size to allow efficient removed the settled slurry.

In an embodiment, the settling leg 9 when designed for a 30 ton/hour production rate of polyethylene may have a total length of 2.8 m, with the length of the tapered conical part being 1 m. The diameter of the non-tapered part of the settling leg can be of 0.75 m. The take off line 11 can be a 0.15 m internal diameter pipe. The inlet of the take off line 11 is perpendicular to the settling leg and can be located on the side of the settling leg at 0.4 m from the top of said settling leg 9. The solid concentration in the reactor is around 40%. The flow trough the line 11 is not controlled but is estimated at about 500 m$^3$/hour based on pressure drop and pipe length and size. The return line 12 connected to the reactor before the circulation pump can be also 0.15 m in diameter. Using theses conditions, the solid concentration at the outlet of the single settling leg is 62% and is sent to the recovery section, with 30 ton/hour of polymer and 18.4 ton/hour of diluent and monomer. When the settling leg is by-passed, the solid concentration is equal to 40% with 30 ton/hour of polymer and 45 ton/hour of diluent and monomer.

In an embodiment, the volume of the settling leg is designed so that the residence time of the settled polymer leg is not too long such as for example around one minute.

In an embodiment, for any given volume of settled polymer slurry 17 downwardly released through the valve 13 from the settling leg 9, the given volume of settled polymer slurry typically comprises around 60% to 65% by weight of polymer particles whereas the unsettled slurry 16 in said leg comprises from 30 to 55% of polymer particles. In the drawing the separation line between the settled polymer slurry 17 and the unsettled slurry 16 has been arbitrarily drawn to schematically illustrate the volume of settled slurry 17. The unsettled slurry 16 exits the settling leg 9 via exit port 19 of said settling leg and is recycled back to the reactor through the return line 12. The exit port 19 may be formed in any suitable shape, such as circular, rectangular, oval, or a combination thereof. Preferably said exit port 19 has a circular shape. Although said exit port 19 has been illustrated as located on the top portion of the settling leg 9, said exit port 19 and correspondingly the return line 12 can be suitable connected or positioned in the upper portion of the settling leg 9, i.e. above or at the mid point, i.e. below the actual top portion of the settling leg 9. For example, the return line 12 can be axially connected to the top of said settling leg 9 or radially connected to the side of said leg. The slurry flow and renewal in the settling leg is driven by the pressure differential between the pressure in the reactor at the point of the take off line 11 and the suction zone of the circulating pump 2. The single settling leg is sufficient to allow a suitable settling for the production rate and is thereby limiting the quantity of diluent that has to be treated and re-fed to the reactor.

Although not illustrated herein, the take off line 11 and the return like 12 may be connected to the loop reactor 1 with valves, such as isolation valves. These valves may for example be ball valves. Under normal conditions these valves are open. These valves can be closed for example to isolate the settling leg 9 from operation. Said valves can be closed when the reactor pressure falls below a chosen value. Insulation valves can be useful for safety reasons, especially if there is more than one 'single' settling leg. The single settling leg must then be understood as a single leg in operation. The valves can be of any type suitable to do the job, such as a piston valve or a pad-mounted ball valve.

The pressure and temperature values in the settling leg according to the present invention are generally adjusted so that most of the diluent present remains in liquid form. Preferably the pressure and temperature are of those in the polymerization reactor. The pressure in the single settling leg (when it is in use and no isolation valve closed) is at an intermediate pressure between the inlet and the outlet line. So it is basically similar to the reactor. The temperature in the settling leg may increase due to the reaction with the residual ethylene. It can be controlled with controlled residence time and/or jacket around the leg.

Polymer slurry settled in the settling leg 9 may be removed by means of a product recovery lines 10, e.g. to a product recovery zone. The discharge valve 13 that can be used may be any type of valve that can permit efficient discharge of a polymer slurry. Some control valves could be used in order to have a continuous outlet, in this case the valve is not fully open. Non-limiting examples of suitable discharge valve are the same as that described above.

The discharge valve can be controlled to periodically open at predetermined frequencies and sequence to permit the discharge of the polymer slurry settled in said settling leg. For example, a suitable pressure controller can be connected to the reactor and be in operational connection to the discharge valve.

In another preferred embodiment, by operation in accordance with the present invention, all lines, vessels, pumps, valves, etc can be kept free of clogging by means of flushing or purging with nitrogen or diluent, i.e. isobutane. It is to be understood that where necessary flushing and purging means and lines are available on the device according to the invention in order to avoid plugging, or blocking or to avoid low, 'unpurgeable' points.

According to the process of the present invention, the settled polymer slurry may be continuously or periodically discharged from the loop reactor into a product recovery zone. As used herein "product recovery zone" includes but is not limited to heated or not heated flash lines, flash tank, cyclones, filters and the associated vapor recovery and solids recovery systems or transfer lines to another reactor or said other reactor when several reactors are connected in series.

When no reactor is present downstream of said settling leg, the extracted slurry may be depressurized and transferred through for example heated or not heated flash lines to a flash tank where the polymer and the unreacted monomer and/or co-monomer and diluent are separated. The degassing of the polymer may be further completed in a purge column.

When at least one reactor is present downstream of said single settling leg, the extracted slurry is transferred through a transfer line connected to said settling leg to the next reactor. Transfer is made possible by injecting the slurry in the downstream reactor in a point where the pressure is lower than the pressure at the outlet of the settling legs.

The present invention encompasses single or more loop reactors according to the present invention, which can be used in parallel or in series. Said reactors operate in a liquid full mode.

For example, two reactors may be operated in series to produce, simultaneously, the same or two different polymer products, depending on the polymer feed stock and catalyst provided and the temperature, pressure and other conditions maintained in the reactors.

The final polymer product produced by the multiple loop reactors is dependent upon a wide range of variables which may be separately adjusted in at least two loop reactor systems, including compositions of the fluidizing mediums in each loop reactor, the polymerization catalysts, the temperatures, pressures, flow rates and other factors maintained in the different reactors.

In another aspect, the present invention relates to multiple loop reactors comprising at least two loop reactors, whereby a first and second loop reactors are connected in series via a single settling leg indirectly connected to said first reactor. In particular, said single settling leg is connected to said first loop reactor through (a) a take off line extending from said first reactor to said settling leg and configured to remove said polymer slurry from said reactor, and (b) a return line extending from said settling leg to said first reactor, wherein said take off line is radially connected to said single settling leg.

Figure 3:
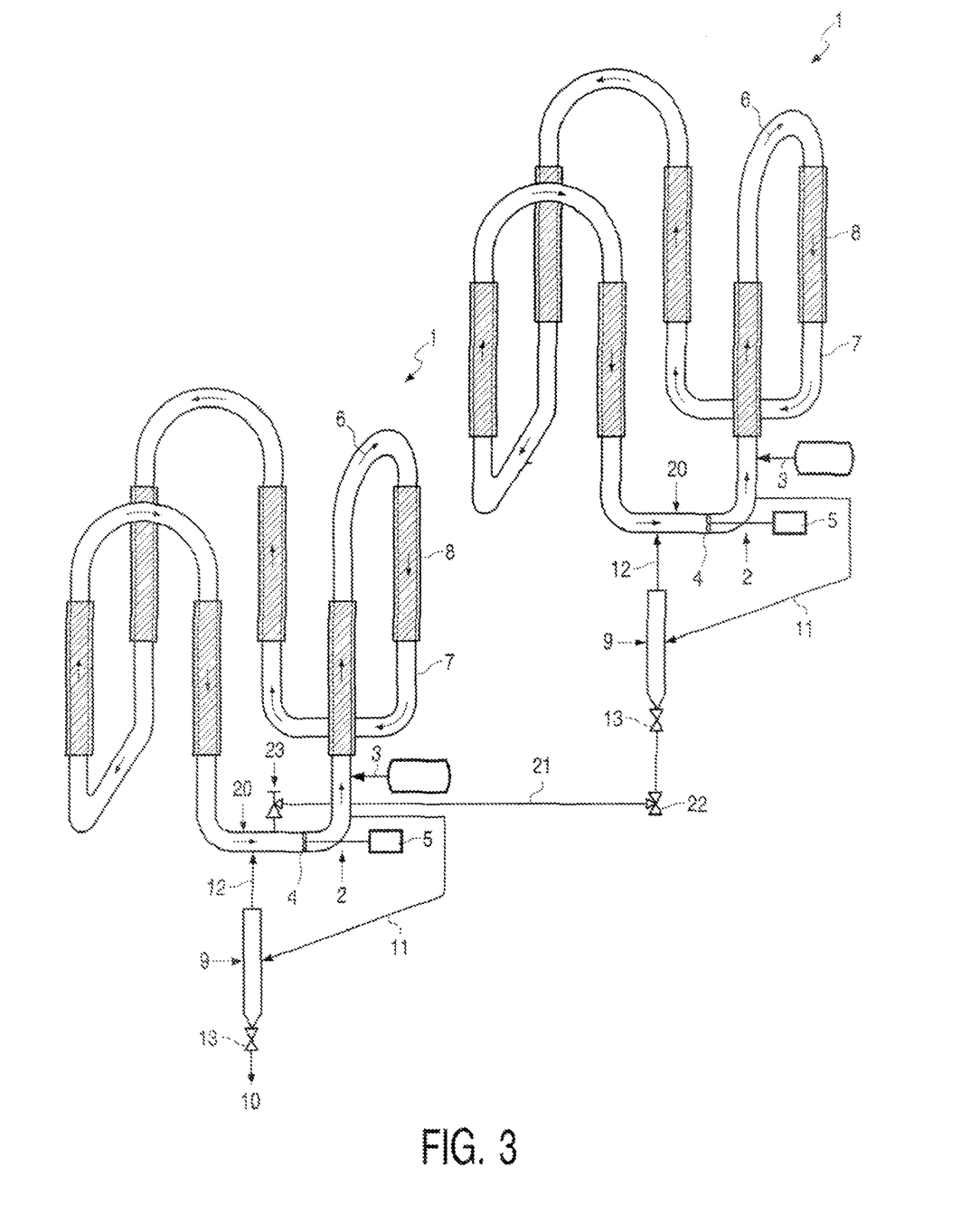
FIG. 3 is a schematic representation of two loop reactor of FIG. 1 serially connected according to an embodiment of the present invention.

Referring now to FIG. 3, two loop reactors 1 are illustrated which are connected in series in accordance with embodiments of the present invention. Although, in a preferred embodiment, the invention comprises the use of two separate loop reactors, it will be appreciated by those skilled in the art that the invention also may be practiced using more than two separate reactors.

Both reactors 1 consist of a plurality of interconnected pipes 7. The vertical sections of the pipe segments 7 are preferably provided with heat jackets 8. Reactants are introduced into the reactors 1 by line 3. Catalyst, optionally in conjunction with a co-catalyst or activation agent, may be injected in one or both of the reactors 1 via conduct 20. The polymerization slurry is directionally circulated throughout the loop reactors 1 as illustrated by the arrows 6 by one or more pumps, such as axial flow pump 2. The pumps may be powered by an electric motor 5. The pumps may be provided with set of rotating impellers 4. The two loop reactors 1 are connected in series via the single settling leg 9 of the first loop reactor 1 shown of the right of FIG. 3. The settling leg 9 of the first reactor 1 on the right is connected to said first reactor 1 through a take off line 11 extending from said reactor to said settling leg and a return line 12 extending from said settling leg to said reactor. The settling leg 9 can be provided with product take off or discharge valves 13. Downstream the valve 13 at the exit of the settling leg 9 of said first reactor 1, a transfer line 21 is provided which allows to transfer polymer slurry settled in the settling leg 9 to the second reactor 1, preferably through a piston valve 23. These transfer lines comprise generally cylindrical, intermediate product transfer lines. Along the transfer line 21, a three-way valve 22 may divert the flow to a product recovery zone if the multiple loop reactor has to be used in a parallel configuration. The second reactor 1 has also a single settling leg 9 indirectly connected to said second loop reactor 1 through a take off line 11 extending from said reactor to said settling leg and a return line 12 extending from said settling leg to said reactor. Polymer slurry settled in the settling leg 9 of second reactor 1 can be removed by means of one or more product recovery lines 10, e.g. to a product recovery zone.

The present invention therefore encompasses multiple loop reactors comprising at least a first loop reactor according to the invention, comprising a single settling leg connected to said first loop reactor through (a) a take off line extending from said first reactor to said settling leg and configured to remove said polymer slurry from said reactor, and (b) a return line extending from said settling leg to said first reactor, wherein said take off line is radially connected to said single settling leg, and at least a second loop reactor according to the invention comprising a single settling leg connected to said second loop reactor through (a) a take off line extending from said second reactor to said settling leg and configured to remove said polymer slurry from said reactor, and (b) a return line extending from said settling leg to said second reactor, wherein said take off line is radially connected to said single settling leg, whereby said first and second loop reactors are connected in series via the single settling leg of the first loop reactor.

Figure 4:
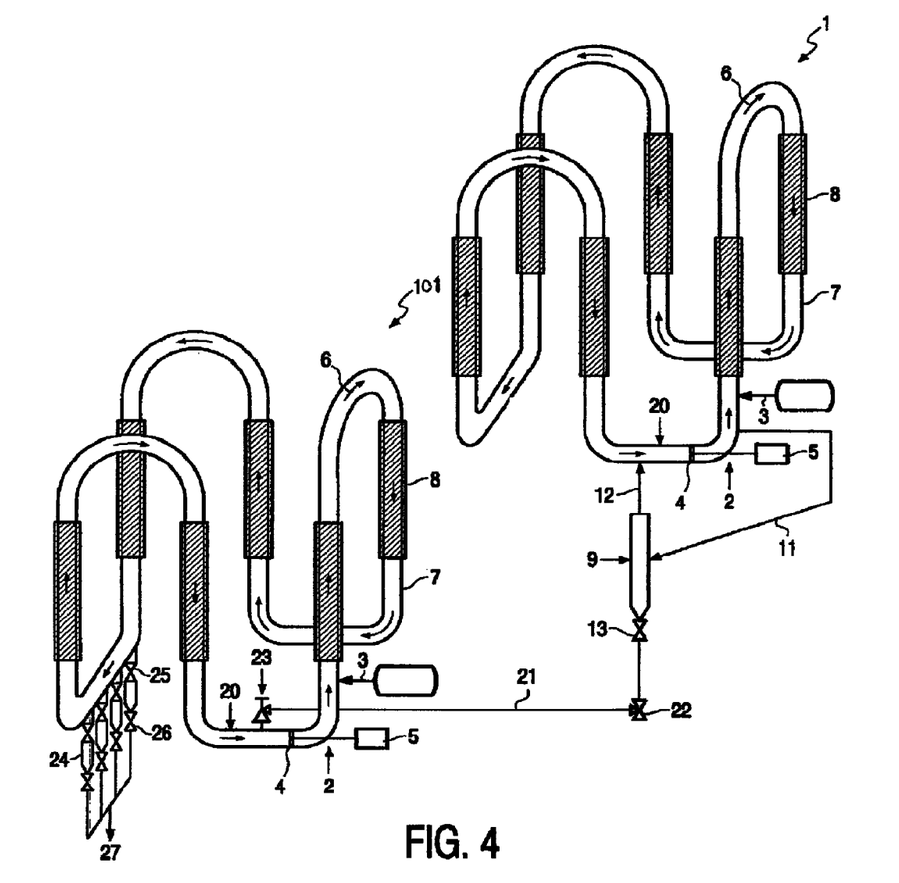
FIG. 4 is a schematic representation of the loop reactor of FIG. 1 serially connected with a conventional loop reactor in another embodiment of the present invention.

FIG. 4 illustrates another embodiment of the present invention, and represents two single loop reactors 1, 101, which are interconnected in series. Both reactors 1, 101 consist of a plurality of interconnected pipes 7. The vertical sections of the pipe segments 7 are preferably provided with heat jackets 8. Reactants are introduced into the reactors 1, 101 by line 3. Catalyst, optionally in conjunction with a co-catalyst or activation agent, is injected in the reactor 1 or 101 via the conduct 20. The polymerization slurry is directionally circulated throughout the loop reactors 1, 101 as illustrated by the arrows 6 by one or more pumps, such as axial flow pump 2. The pumps may be powered by an electric motor 5. The pumps may be provided with set of rotating impellers 4.

The two loop reactors 1, 101 are connected in series via the single settling leg 9 of the loop reactor 1. The settling leg 9 of the reactor 1 is connected to said reactor 1 through a take off line 11 extending from said reactor to said settling leg and a return line 12 extending from said settling leg to said reactor. The settling leg 9 can be provided with product take off or discharge valves 13. Downstream the valve 13 at the exit of the settling leg 9 of said first reactor 1, a transfer line 21 is provided which allows to transfer polymer slurry settled in the settling leg 9 to the reactor 101, preferably through a piston valve 23. These transfer lines comprise generally cylindrical, intermediate product transfer lines. Along the transfer line 21, a three-way valve 22 may divert the flow to a product recovery zone if the multiple loop reactor has to be used in a parallel configuration.

The reactor 101 is provided with one or more conventional settling legs 24 connected to the pipes 7 of the reactors 101. The settling legs 24 are preferably provided with an isolation valve 25. Further the settling legs 24 can be provided with product take off or discharge valves 26. Polymer slurry settled in the settling legs 24 of reactor 101 can be removed by means of one or more product recovery lines 27, e.g. to a product recovery zone.

The present invention therefore encompasses also multiple loop reactors comprising at least a first loop reactor, comprising a single settling leg connected to said first loop reactor through (a) a take off line extending from said first reactor to said settling leg and configured to remove said polymer slurry from said reactor, and (b) a return line extending from said settling leg to said first reactor, wherein said take off line is radially connected to said single settling leg, and at least a second loop reactor comprising one or more settling legs connected to said second reactor, whereby said first and second loop reactors are connected in series via the single settling leg of the first loop reactor.

Although not illustrated herein, the present invention also encompasses multiple loop reactors comprising at least a first loop reactor comprising a plurality of interconnected pipes defining a flow path for a polymer slurry, means for introducing olefin reactant, polymerization catalyst and diluent into said reactor, a pump suitable for maintaining the polymer slurry in circulation in said reactor, and one or more settling legs connected to said first reactor, and at least a second loop reactor according to the present invention, comprising a single settling leg connected to said second loop reactor through (a) a take off line extending from said second reactor to said settling leg and configured to remove said polymer slurry from said reactor, and (b) a return line extending from said settling leg to said second reactor, wherein said take off line is radially connected to said single settling leg. Said first and second loop reactors being connected in series via one or more settling legs of the first loop reactor.

In another embodiment, the present invention encompasses loop reactors comprising a plurality of interconnected pipes defining a flow path for a polymer slurry, means for introducing olefin reactant, polymerization catalyst and diluent into said reactor, a pump suitable for maintaining the polymer slurry in circulation in said reactor, and comprising two settling legs with only one in operation herein referred as the single settling leg. One or both of said settling legs could be connected to said reactor through (a) a take off line extending from said reactor to said settling leg and configured to remove said polymer slurry from said reactor, and (b) a return line extending from said settling leg to said reactor, wherein said take off line is radially connected to said single settling leg. The second settling leg could be used when the single settling leg in operation is blocked or for safety reasons.

It was surprisingly found that the use of said single settling leg permits an enhanced settling of the polymer slurry, superior to when using at least 2 conventional settling legs altogether, more preferably superior to at least 4 settling legs altogether, yet more likely superior to at least 6 settling legs altogether, depending on the diameter of said single settling leg. The use of a single settling leg is also less expensive and more robust, more in particular when compared to the use of a hydrocyclone.

According to the present invention, the triggering of the opening and closing of the settling leg according to the invention is controlled by computational means. These computational means allow the adjustment and the control of the periodical opening at predetermined frequencies and sequence of the settling leg. Other control means such as pressure or temperature controllers and flow controllers, flow transducers and flow sensors may be used to further fine-tune the discharging process The present invention encompasses different types of control means which accomplish the purpose of the invention. The invention is also applicable to mechanical, hydraulic or other signal means for transmitting information. In almost all control systems some combination of electrical, pneumatic, mechanical or hydraulic signals will be used. However, use of any other type of signal transmission, compatible with the process and equipment in use, is within the scope of the invention.

The actuation and the control of the discharging step into a product recovery zone and into another reactor can be implemented using electrical analog, digital electronic, pneumatic, hydraulic, mechanical or other similar types of equipment or combinations of one or more such equipment types. A computational means is used in the preferred embodiment of this invention to operate and control the process parameters. Computers or other types of computing devices can be used in the invention.

The present invention further encompasses the use of a single settling leg indirectly connected to a reactor for settling and for further discharging settled polymer slurry into a product recovery zone. In another embodiment said single settling leg indirectly connected to said first reactor can be used to connect in series to or more reactors. In these embodiments, said single settling leg is indirectly connected to the loop reactor through (a) a take off line extending from said reactor to said settling leg and (b) a return line extending from said settling leg to said reactor. In an embodiment of the present invention said take off line is radially connected to said single settling leg.

More in particular, the present invention further encompasses the use of a single settling leg indirectly connected to a reactor for settling and for further discharging settled polymer slurry into a product recovery zone, wherein said settling leg is connected to said loop reactor through (a) a take off line extending from said reactor to said settling leg and configured to remove said polymer slurry from said reactor, and (b) a return line extending from said settling leg to said reactor, and wherein said take off line is radially connected to said single settling leg. In another embodiment said single settling leg indirectly connected to said first reactor can be used to connect in series to or more reactors.

It has been observed that by using a single settling leg as configured in the present invention, settling of the polymer was improved by the radial introduction of the slurry in the leg, thereby providing higher concentration in solids.

In addition, the diameter of the pipes connecting the reactor to the settling leg is no longer a limiting factor, and connecting pipes of smaller diameter can be used with the single settling leg.

It has been observed that by using a single settling leg as described in the present invention instead of several smaller conventional settling legs, higher weight percent solids can be circulated in the reactor. Furthermore, increased weight percent solids in the loop reactor increase catalyst residence time and increase catalyst productivity. Higher solids also increase the weight percent solids removed from the reactor, which reduces the diluent processing cost in recycle equipment.

Although the present invention has been described with considerable detail with reference to certain preferred variations thereof, other variations are possible. Therefore, the spirit and scope of the appended claims should not be limited to the preferred variations described herein.

The invention claimed is:

1. A loop reactor adaptable for olefin polymerization process comprising:
    a plurality of interconnected pipes defining a flow path for a polymer slurry, said slurry consisting essentially of an olefin reactant, a polymerization catalyst, liquid diluent and solid olefin polymer particles;
    means for introducing olefin reactant, polymerization catalyst and diluent into said reactor; a pump suitable for maintaining the polymer slurry in circulation in said reactor; and
    a single settling leg connected to said loop reactor through a take off line extending from said reactor to said settling leg and configured to remove said polymer slurry from said reactor; and
    a return line extending from said settling leg to said reactor, wherein said take off line is radially connected to said single settling leg, wherein an internal diameter of said settling leg is equal to 0.8 to 2 times an internal diameter of the loop reactor pipe.

2. The loop reactor of claim 1, wherein an internal diameter of said take off line is equal to 0.14 to 0.3 times an internal diameter of the loop reactor pipe.

3. The loop reactor of claim 1, wherein said take off line is connected in an upper third of said single settling leg.

4. A polymerization process for producing olefin polymers in a loop reactor, comprising:
    introducing into the loop reactor of claim 1 one or more olefin reactants, polymerization catalysts and diluents, and while circulating said reactants, catalysts and diluents; polymerizing said one or more olefin reactants to produce a polymer slurry comprising essentially liquid diluent and solid olefin polymer particles; and one or more cycles of:

withdrawing a portion of the slurry from a section of said reactor;

radially introducing the polymer slurry into a single settling leg through a take off line extending from said reactor to said settling leg;

allowing said polymer slurry to settle into said single settling leg; and withdrawing unsettled polymer slurry from an upper zone of said settling leg and recycling the withdrawn unsettled polymer slurry to the loop reactor through a return line extending from said settling leg to said reactor; and/or while discharging the settled polymer slurry from a lower zone of said single settling leg out of the reactor into a product recovery zone or into another reactor.

5. Multiple loop reactors adapted for olefin polymerization comprising at least two loop reactors, whereby a first and second loop reactors are connected in series via a single settling leg of the first reactor, wherein said single settling leg is connected to said first loop reactor through a take off line extending from said first reactor to said settling leg and configured to remove said polymer slurry from said reactor, and a return line extending from said settling leg to said first reactor, wherein said take off line is radially connected to said single settling leg.

6. The multiple loop reactors of claim 5 further comprising:
at least a first loop reactor comprising a single settling leg connected to said first loop reactor through a take off line extending from said first reactor to said settling leg and configured to remove said polymer slurry from said reactor, and
a return line extending from said settling leg to said first reactor, wherein said take off line is radially connected to said single settling leg; and
at least a second loop reactor comprising a single settling leg connected to said second loop reactor through a take off line extending from said second reactor to said settling leg and configured to remove said polymer slurry from said reactor, and
a return line extending from said settling leg to said second reactor, wherein said take off line is radially connected to said single settling leg, whereby said first and second loop reactors are connected in series via the single settling leg of the first loop reactor.

7. The multiple loop reactors of claim 5 further comprising:
at least a first loop reactor comprising a single settling leg connected to said first loop reactor through a take off line extending from said first reactor to said settling leg and configured to remove said polymer slurry from said reactor, and
a return line extending from said settling leg to said first reactor, wherein said take off line is radially connected to said single settling leg; and
at least a second loop reactor comprising a plurality of interconnected pipes defining a flow path for a polymer slurry, said slurry consisting essentially of an olefin reactant, a polymerization catalyst, liquid diluent and solid olefin polymer particles, means for introducing olefin reactant, polymerization catalyst and diluent into said reactor, a pump suitable for maintaining the polymer slurry in circulation in said reactor, and one or more settling legs connected to the pipes of said second reactor, whereby said first and second loop reactors are connected in series via the single settling leg of the first loop reactor.

8. Multiple loop reactors adaptable for olefin polymerization comprising:
at least a first loop reactor comprising a plurality of interconnected pipes defining a flow path for a polymer slurry, said slurry consisting essentially of an olefin reactant, a polymerization catalyst, liquid diluent and solid olefin polymer particles, means for introducing olefin reactant, polymerization catalyst and diluent into said reactor, a pump suitable for maintaining the polymer slurry in circulation in said reactor, and one or more settling legs connected to said first reactor, at least a second loop reactor comprising a single settling leg connected to said second loop reactor through a take off line extending from said second reactor to said settling leg and configured to remove said polymer slurry from said reactor, and a return line extending from said settling leg to said second reactor, wherein said take off line is radially connected to said single settling leg, whereby said first and second loop reactors are connected in series via one or more settling legs of the first loop reactor.

9. The multiple loop reactors of claim 8, wherein an internal diameter of said take off line is equal to 0.14 to 0.3 times an internal diameter of the loop reactor pipe.

10. The multiple loop reactors of claim 8, wherein said take off line is connected in an upper third of said single settling leg.

11. The multiple loop reactors of claim 8, wherein an internal diameter of said single settling leg is equal to 0.8 to 2 times an internal diameter of the loop reactor pipe.

* * * * *